United States Patent [19]
Kropfield

[11] Patent Number: 5,810,254
[45] Date of Patent: Sep. 22, 1998

[54] LOW PRESSURE POLYURETHANE SPRAYING ASSEMBLY

[75] Inventor: Scott A. Kropfield, Cincinnati, Ohio

[73] Assignee: Illnois Tool Works, Inc., Glenview, Ill.

[21] Appl. No.: 802,605

[22] Filed: Feb. 19, 1997

Related U.S. Application Data

[63] Continuation-in-part of Ser. No. 777,777, Dec. 31, 1996, abandoned.

[51] Int. Cl.$^6$ ............................... B05B 7/00; B05B 1/28; B05B 7/30
[52] U.S. Cl. ............................ 239/61; 239/74; 239/290; 239/307; 239/343; 239/432; 239/526; 239/532
[58] Field of Search ............................... 239/61, 71, 74, 239/162, 163, 432, 290, 343, 304, 307

[56] References Cited

U.S. PATENT DOCUMENTS

| | | | |
|---|---|---|---|
| 3,383,044 | 5/1968 | Norstrud et al. | 239/61 |
| 4,428,530 | 1/1984 | Chabria | 239/113 |
| 4,771,919 | 9/1988 | Ernst | 239/343 |
| 4,789,100 | 12/1988 | Bonf | 239/61 |
| 4,809,909 | 3/1989 | Kukesb | 239/61 |
| 4,813,603 | 3/1989 | Takeuchi et al. | 239/113 |

*Primary Examiner*—Kevin Weldon
*Attorney, Agent, or Firm*—Howard & Howard

[57] ABSTRACT

A low pressure spraying assembly for mixing and initiating the reaction of a first liquid reactive polymeric material, such as an isocyanate terminated compound, with a second liquid reactive polymeric material, such as an hydroxyl terminated compound or polyol resin, to form a two part polymer, such as polyurethane, and spraying the polymer onto a surface. The spraying assembly includes a material circulating system and a spray gun assembly. The material circulating system comprises separate multiple diaphragm pumps, drive assemblies, flow meters and feedback controllers for each material. The spray gun assembly includes a manifold with a pair of fluid ports for receiving the first and second polymeric materials. A mixing device is mounted to the manifold for mixing the materials to form the two part polymer. A spray tip with an air cap is mounted to the distal end of the mixing device for spraying the polymeric material. The air cap includes both a main outlet port for dispensing the polymer and atomizing outlet ports for atomizing the polymer. The spray gun assembly also includes an air purging operation for simultaneously removing any polymeric materials from the main outlet port and the atomizing outlet ports, thereby preventing any clogging of the atomizing outlet ports.

31 Claims, 5 Drawing Sheets

LOW PRESSURE POLYURETHANE SPRAYING ASSEMBLY

RELATED APPLICATION

This is a continuation-in-part of application Ser. No. 08/777,777, now abandoned, filed on Dec. 31, 1996.

TECHNICAL FIELD

The subject invention relates to a material circulating system for supplying a two-part liquid reactive polymer, such as polyurethane, to a spray gun assembly for spraying a mixture of the two part liquid polymer onto a surface. The spray gun assembly includes an air purging operation for cleaning the mixture of the two part polyurethane from the spray gun assembly when not in use.

BACKGROUND OF THE INVENTION

Utilizing a circulating system and a spray gun assembly for spraying two part liquid reactive polymers, such as polyurethanes, onto various surfaces is well known in the art. A polyurethane polymer results from the reaction of an isocyanate having an isocyanate terminated compound and a polyol having an hydroxyl terminated compound. The polyurethane is sprayed onto an area requiring a protective skid resistant surface, such as the interior bed of a pickup truck or the inside of a trailer. The polyurethane adheres to the area and has a very fast curing time, usually between 15 and 30 seconds. These two part polyurethanes require very specific percentage ratios of the two material components. Any significant variation, typically greater than two or three percent, will not produce a polyurethane with the desired characteristics. The polyurethane may not adhere effectively, cure effectively or as quickly, or may not have the desired durability. Hence, a consistent and accurate metering pump is required for each material supplied to the system. Accurate metering pumps ensure that the desired percentage ratio is maintained.

Metering cylinders or gear pumps are two examples of metering pumps that are usually used to obtain the desired accuracy. Metering cylinders typically utilize a common piston interconnected to a pair of cylinders. The movement of the piston controls the strokes of the cylinders. The cylinders have a different bore size corresponding to the desired percentage ratio. For example if a specific material combination requires a two to one ratio, one metering cylinder will have a bore size twice as large as the bore size of the other metering cylinder. Gear pumps utilize a sprocket within a fluid chamber wherein the movement of the sprocket causes a movement in the material. A gearing assembly controls the speed of the sprocket which in turn controls the speed of the material. These types of pumps, however, have a number of deficiencies.

First, the cylinders, gears and valves can be very expensive to purchase and maintain. Further, their effective running life is limited to the durability of their various seals. If the seals surrounding the cylinders or the different components of the gear pumps experience even the slightest leak, the accuracy of the pump may become inconsistent. In addition, material has a tendency to accumulate around the sprocket in the gear pump which effects the accuracy of the fluid flow. The durability of these pumps is further hindered when an abrasive fluid material, such as a polyol resin with a silica sand filler, is being used. The abrasive fluid material severely shortens the metering cylinder's or gear pump's life by excessively wearing on the seals and/or gears.

Also, metering cylinders have a limited pumping range dependent upon its stroke length and the bore size. As discussed above, the bore ratios between the two cylinders and/or the stroke length determine the percentage ratio. Hence, the metering cylinders are limited to pumping a specific amount of material at one time. Accordingly, when different materials are used that require a different percentage ratio, different cylinders with different bore ratios must be utilized. The conversion and adjustment time between the different cylinders can be substantial.

During the operation of the spraying system the metering cylinders and gear pumps stop pumping material when the discharge of material is stopped. During re-engagement of the spraying system the materials have a tendency to surge due to back up pressure within the metering cylinders or gear pumps. This surging can cause inaccurate percentage ratios between the two materials.

The use of multiple diaphragm pumps, which can be significantly less expensive, are not susceptible to seal leaks, and are capable of wide pumping ranges, have in the past been very ineffective. These failures are attributed to the multiple diaphragm pumps' increasing sensitiveness to temperature, moisture, viscosity changes, and diaphragm deflection. These sensitivities make it difficult to maintain accurate pumping percentage ratios.

The spray gun assembly is typically connected to the circulating system for mixing the two part polyurethane and then dispensing the polyurethane onto the desired surface. Spray gun assemblies are manufactured in a number of different designs including hand held or stationary designs as are well known in the art. The spray gun assembly typically includes a manifold portion, a mixing device, and a spray tip. Mixing devices are commonly utilized in mixing these types of materials and are available in a wide variety of shapes and sizes. The spray tip may have a number of atomizing outlets for atomizing the polyurethane as it exits an outlet port.

Once an application of the polyurethane is completed, the spray gun stops dispensing the mixed materials. Due to the quick curing times of the polyurethane, any mixed material within the mixing device and spray tip must be removed. Hence, between operations, air is commonly purged through the spray gun assemblies' manifold, mixing device, and spray tip to clean out all mixed material. During this operation, however, the atomizing outlets frequently become clogged with the discharged materials. This causes additional down time between applications since the user must remove the spray tip and clean the atomizing outlets.

SUMMARY OF THE INVENTION AND ADVANTAGES

An assembly for mixing two reactive liquid polymeric components or materials and spraying the mixture onto a surface. The assembly includes a first pump having multiple pumping chambers with a diaphragm in each chamber and an inlet port for delivering a first material to the diaphragms. A first drive assembly sequentially moves the diaphragms to continuously move the first material through the first pump. An outlet port on the first pump discharges the first material under pressure. A first flow meter is connected to the outlet port of the first pump for receiving the first material under pressure. A first feedback controller interconnects the first flow meter and the first drive assembly for governing the first drive assembly in response to fluid flow through the first flow meter.

The assembly also includes a second pump having multiple pumping chambers with a diaphragm in each chamber and an inlet port for delivering a second material to the diaphragms. A second drive assembly sequentially moves the diaphragms to continuously move the second material through the second pump. An outlet port on the second pump discharges the second material under pressure. A second flow meter is connected to the outlet port of the second pump for receiving the second material under pressure. A second feedback controller interconnects the second flow meter and the second drive assembly for governing the second drive assembly in response to fluid flow through the second flow meter.

A spray gun is also included having a manifold with first and second premixing chambers. A first fluid port disposed within the first premixing chamber delivers the first material to the first premixing chamber. A second fluid port disposed within the second premixing chamber delivers the second material to the second premixing chamber. A first hose interconnects the first flow meter and the first fluid port of the first premixing chamber for conveying the first material from the first flow meter to the first premixing chamber. A second hose interconnects the second flow meter and the second fluid port of the second premixing chamber for conveying the second material from the second flow meter to the second premixing chamber. A mixing device is mounted to the manifold. A spray tip is mounted to the distal end of the mixing device. An air cap is mounted to a distal end of the spray tip and is in fluid communication with the first and second premixing chambers of the manifold for spraying a mixture of the first and second materials onto a surface. A main outlet port is disposed within the air cap. Atomizing outlet ports are also disposed within the air cap and surround the main outlet port for atomizing the mixture of the first and second materials.

A first air inlet port is mounted in close proximity to the second fluid port within the second premixing chamber for delivering a gaseous material to the second premixing chamber, into the mixing device, through the air cap, and out the main outlet port. A second air inlet port is mounted on the spray tip for delivering the gaseous material into the air cap and out the atomizing outlet ports. A crossover air hose interconnects the first air inlet port and the second air inlet port. A first supply air hose is included for supplying the gaseous material. A valve assembly interconnects the first air inlet port, the first supply air hose, and the crossover air hose for simultaneously supplying the gaseous material to the second premixing chamber, the mixing device, the air cap, and the second air inlet port to simultaneously discharge the gaseous material out the main outlet port and the atomizing outlet ports for removing the first and second materials from the spray gun after spraying the mixture of the first and second materials onto the surface.

Accordingly, the subject invention incorporates the use of multiple diaphragm pumps for supplying a two-part liquid reactive polymer, such as polyurethane, to a spray gun while maintaining the required accuracy in percentage ratios between the two materials. Further, the subject invention utilizes a crossover air hose to simultaneously clean the main outlet port and the atomizing outlet ports during an air purging operation, thereby eliminating any clogging of the atomizing outlet ports.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
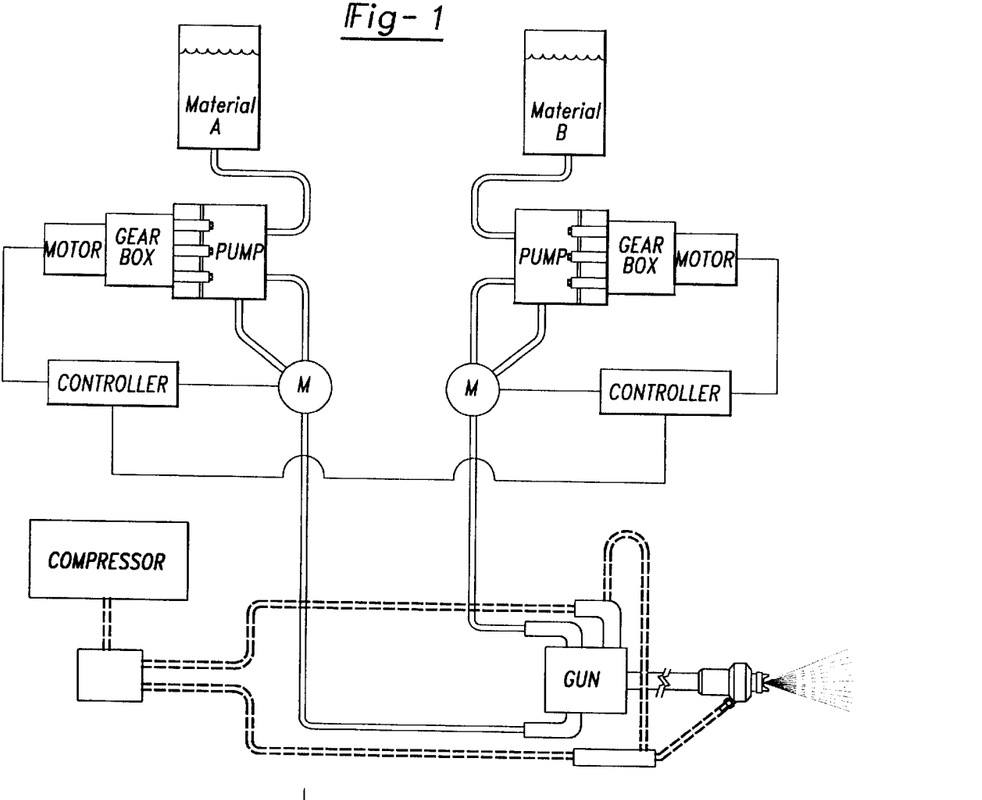
FIG. 1 is a schematic view of the entire assembly of the subject invention.

Referring to the Figures, wherein like numerals indicate like or corresponding parts throughout the several views, a low pressure liquid reactive polymer spraying assembly for mixing two components of the polymer and spraying the mixture onto a surface is shown schematically at 10 in FIG. 1. The assembly includes a material circulating system 12 and a spray gun assembly 14. For illustrative purposes, all electrical connections are shown as single solid lines, all material fluid flow connections are shown as double solid lines, and all air flow connections are shown as double dashed lines in FIG. 1. For ease of description, it will be assumed that the polymer is a two component polyurethane.

The material circulating system 12 comprises a first pump 16 having a first drive assembly, generally shown at 18, and a second pump 20 having a second drive assembly, generally shown at 22. The first pump 16 continuously delivers a first liquid component or material 24, under pressure, to a first flow meter 26. The second pump 20 continuously delivers a second liquid component or material 28, under pressure, to a second flow meter 30. The first material 24 is an isocyanate terminated compound such as marketed and sold under the tradename FSA 29 by ITW Foamseal of Lapeer, Mich. The second liquid component 28 is polyol resin or a hydroxyl terminated compound such as marketed and sold under the tradename V92 77 by ITW Foamseal of Lapeer, Mich. These two materials 24, 28 are typical components of a two-part polyurethane. A different combination of materials could be used to create the two part polymer, such as polyurethane, without deviating from the scope of the subject invention. Further, the material circulating system 12 is not limited to polyurethane applications. In fact, any two part liquid reactive polymer that can be sprayed onto a surface may be incorporated into this system 12.

Figure 7:
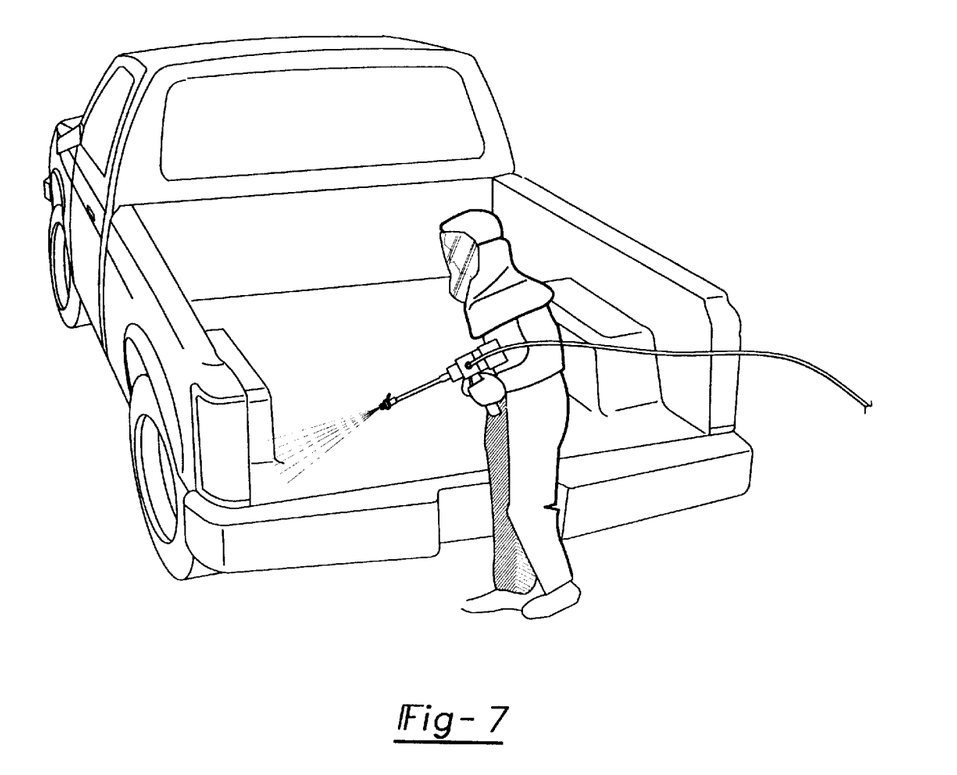
FIG. 7 is a rear perspective view incorporating the spray gun assembly of the subject invention.

The mixing of the isocyanate and polyol resin materials, at correct percentage ratios, produces a very effective polyurethane with a quick curing time. The two part polyurethane can be sprayed onto a number of surfaces that require a protective skid resistant surface. As shown in FIG. 7, typical surfaces can include the interior bed 32 of a pickup truck 34 or the interior surface of a trailer. Any surface where the two part polyurethane can adhere thereto may be used without deviating from the scope of the subject invention. The curing is accomplished by self induced heat produced from an exothermic chemical reaction between the isocyanate terminated compound and the polyol or hydroxyl terminated compound. This heat automatically cures the mixture of the two materials within about 30 seconds. Hence, this particular combination of materials is particularly effective when spraying vertical surfaces or the like that require fast drying times.

Polyol resin filler materials are commonly used to reduce the cost of the resin. Silica sand is a typical filler that reduces the amount of polyol resin required without adversely affecting the characteristics of the polyol resin. As appreciated by those skilled in the art, any number of fillers may be used so long as the filler does not adversely affect the characteristics of the polyol resin or the two part polyurethane. These fillers, however, are somewhat abrasive which, as discussed in the background section, causes additional wear to the working components of metering cylinders and gear pumps.

The material circulating system 12 also includes a first feedback controller 36 interconnecting the first flow meter 26 and the first drive assembly 18 for governing the first drive assembly 18 in response to material fluid flow through the first flow meter 26. Similarly, a second feedback controller 38 interconnects the second flow meter 30 and the second drive assembly 22 for governing the second drive assembly 22 in response to material fluid flow through the second flow meter 30. A first hose 40 interconnects the first flow meter 26 and a first fluid port 42 of the spray gun assembly 14 for conveying the first material 24 from the first flow meter 26 to the spray gun assembly 14. A second hose 44 interconnects the second flow meter 30 and a second fluid port 46 of the spray gun assembly 14 for conveying the second material 28 from the second flow meter 30 to the spray gun assembly 14. Accordingly, the first 24 and second 28 materials remain separated and flow through separate components until the first 24 and second 28 materials merge within the spray gun assembly 14. Components of the material circulating system 12 are discussed in greater detail hereinbelow.

The first feedback controller 36 includes a first digital readout display panel (not shown) for programming a precise material fluid flow through the first flow meter 26. Similarly, the second feedback controller 38 includes a second digital readout display panel (not shown) for programming a precise material fluid flow through the second flow meter 30. The feedback controllers 36, 38 and display panels are commercially available from Dart Controls of Indianapolis, Ind. The second feedback controller 38 is connected to the first feedback controller 36 for coordinating the precise material fluid flows through the first 26 and second 30 flow meters. In other words, the first 36 and second 38 feedback controllers work in conjunction to ensure that the correct percentage ratio between the first 24 and second 28 materials is maintained. The first 36 and second 38 feedback controllers will automatically stop any material fluid flow through both the first 26 and second 30 flow meters when the first 36 or the second 38 feedback controller senses a fault in the system 12. A fault in the system 12 may include any number of occurrences. For example, either controller 36, 38 may sense that the material fluid flow and/or material fluid pressure through either flow meter 26, 30 is too high or too low and cannot be effectively corrected. The controller 36, 38 sensing the fault will then shut down both the first 16 and second 20 pumps to cease the material fluid flow of both the first 24 and second 28 materials. Hence, one controller 36, 38 cannot shut down without the other controller 38, 36 also shutting down. This ensures that the percentage ratio is maintained and also ensures that one material 24, 28 will not flow through the spray gun assembly 14 without the other material 28, 24.

The second digital readout display panel is typically programmed to circulate the second material fluid flow through the second flow meter 30 at a specific percentage of the first material fluid flow through the first flow meter 26. The specific percentage ratio utilized for the isocyanate and polyol resin materials disclosed above is 66.7 to 67.7 percent of polyol resin to isocyanate. The display panels, however, may be programmed in any number of ways without deviating from the scope of the subject invention. Of course the programming of the display panels will be dependent upon the materials used. Programming the display panels to operate on a percentage ratio allows for an easier changeover to different materials. For example, if a different material was to be used that required a different percentage ratio, then only one display panel would need to be reprogrammed to achieve the correct percentage ratio.

Figure 2:
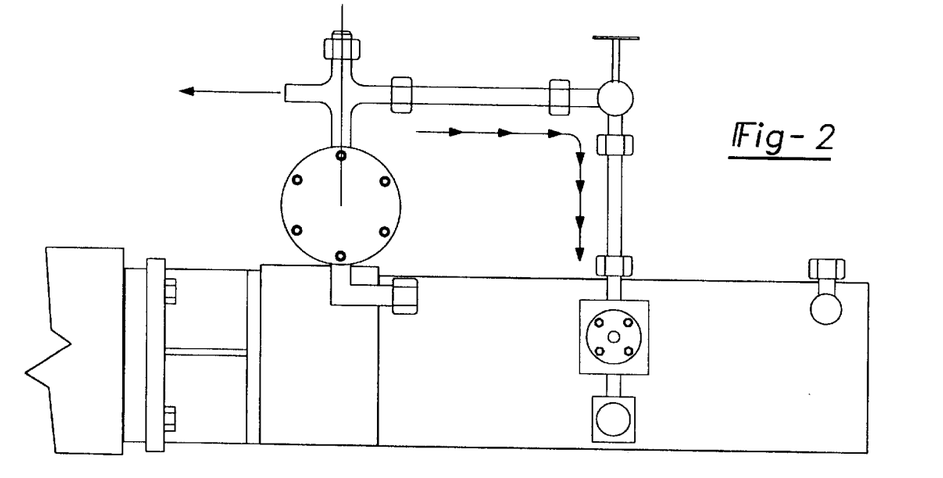
FIG. 2 is a side view of the pumping portion of the subject invention.
Figure 3:
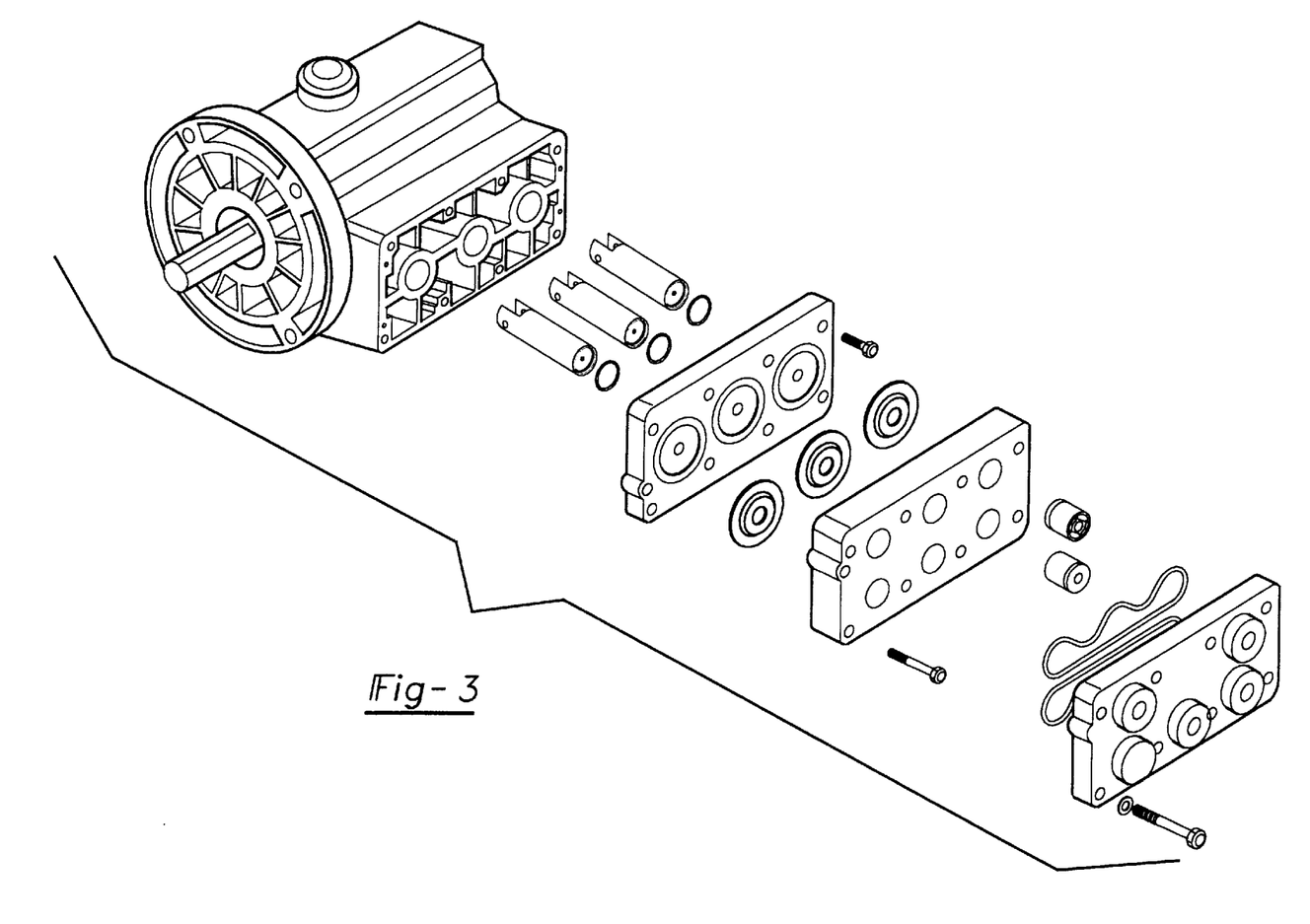
FIG. 3 is an exploded view of a multiple diaphragm pump of the subject invention.

The first 16 and second 20 pumps and corresponding first 18 and second 22 drive assemblies are shown in greater detail in FIGS. 2 and 3. The first 16 and second 20 pumps are substantially the same, hence for illustrative purposes, only the first pump 16 is shown in FIGS. 2 and 3. The pump 16 shown in FIG. 3 is commercially available under the tradename MO3 SERIES PUMP manufactured by Wanner Engineering of Minneapolis, Minn. Both the first 16 and second 20 pumps have multiple pumping chambers 48 with a diaphragm 50 in each chamber 48. Specifically, each pump 16, 20 has three pumping chambers 48 and three actuating pistons 52 with the corresponding diaphragm 50 attached to a distal end thereof. Any number of pumping chambers 48 and diaphragms 50 may be utilized without deviating from the scope of the subject invention so long as an even and constant material fluid flow through the pump can be achieved. An inlet port 54 on the pumps 16, 20 delivers the corresponding material 24, 28 to the diaphragms 50. The drive assembly 18, 22 sequentially moves the diaphragms 50 to continuously move the material 24, 28 through the pump 16, 20. The first drive assembly 18 includes a first cam mechanism 56 and the second drive assembly 20 includes a second cam mechanism (not shown) for sequentially moving the pistons 52, which in turn moves the diaphragms 50. A corresponding gearbox 58 is mounted to both the first 16 and second 20 pumps for driving the first 56 and second cam mechanisms. A first motor 60 is provided for driving the gearbox 58 of the first cam mechanism 56 and a second motor 62 is provided for driving the gearbox 58 of the second cam mechanism. Outlet ports 64 on the pumps 16, 20 discharge the corresponding material 24, 28 under pressure to the corresponding flow meter 26, 30. A typical flow meter utilized in this application is commercially available from Fluid Power Products of Tickfaw, Mich., Model No. 531.0400.

During regular operation, i.e., the spraying of the two part polyurethane through the spray gun assembly 14, the first material 24 flows from a first holding tank 66 through the first pump 16, through the first flow meter 26, and into the spray gun assembly 14. Simultaneously, the second material 28 flows from a second holding tank 68 through the second pump 20, through the second flow meter 30, and into the spray gun assembly 14. Hence, the first 24 and second 28 materials flow simultaneously through their corresponding components and into the spray gun assembly 14. When not in operation, i.e., the spraying of the two part polyurethane has been completed, the first 24 and second 28 materials continue to flow through the corresponding pumps 16, 20 and flow meters 26, 30 as discussed hereinbelow.

A first bypass loop 70 maintains the fluid flow of the first material 24 through the first pump 16 when the spray gun assembly 14 is not in operation. The second pump 20 likewise includes a second bypass loop 72 for maintaining fluid flow of the second material 28 through the second pump 20 when the spray gun assembly 14 is not in operation. In other words, when the spray gun assembly 14 has stopped spraying polyurethane, both the first 16 and second 20 pumps continue to circulate their corresponding materials 24, 28 through their corresponding bypass loops 70, 72. Specifically, the first material 24 remaining within the material circulating system 12 continuously flows from the first pump 16, through the first flow meter 26, into first bypass loop 70 and back through the first pump 16. Similarly the second material 28 remaining within the material circulating system 12 continuously flows from the second pump 20, through the second flow meter 30, into the second bypass loop 72 and back through the second pump 20. Accordingly, the first 24 and second 28 materials continuously circulate through at least a portion of the material circulating system 12 whether or not the spray gun assembly 14 is in operation. This constant flow of the first 24 and second 28 materials ensures that the desired pressure is maintained and virtually eliminates any likelihood of a surge in material when the spray gun assembly 14 is operated. The constant flow of the materials 24, 28 also helps maintain the desired percentage ratio.

The first bypass loop 70 includes a first bypass valve 74 for eliminating any additional fluid flow of the first material 24 into the first pump 16 when the spray gun assembly 14 is not in operation. The second bypass loop 72 likewise includes a second bypass valve (not shown) for eliminating any additional fluid flow of the second material 28 into the second pump 20 when the spray gun assembly 14 is not in operation. The first bypass loop 70 also includes an adjustable first regulator 76 for maintaining a desired back pressure within the first bypass loop 70. Similarly the second bypass loop 72 includes an adjustable second regulator (not shown) for maintaining a desired back pressure within the second bypass loop 72. Specifically, the first 76 and second regulators are adjustable needle valves 76 that maintain a relatively low pressure within the first 16 and second 20 pumps and within the first 70 and second 72 bypass loops when the spray gun assembly 14 is not in operation. The low pressure also assists in preventing any surges in the first 24 and second 28 materials when the spray gun assembly 14 is operated.

A first pressure gauge port 78 is disposed within the pumping chambers 48 of the first pump 16 and a second pressure gauge port (not shown) is disposed within the pumping chambers 48 of the second pump 20. The first pressure gauge port 78 includes a first pressure gauge 80 for displaying the amount of pressure within the first pump 16 and the second pressure gauge port similarly includes a second pressure gauge (not shown) for displaying the amount of pressure within the second pump 20. Any pressure measuring device may be used without deviating from the scope of the subject invention, so long as the pressure within the pumps can be determined.

Figure 4:
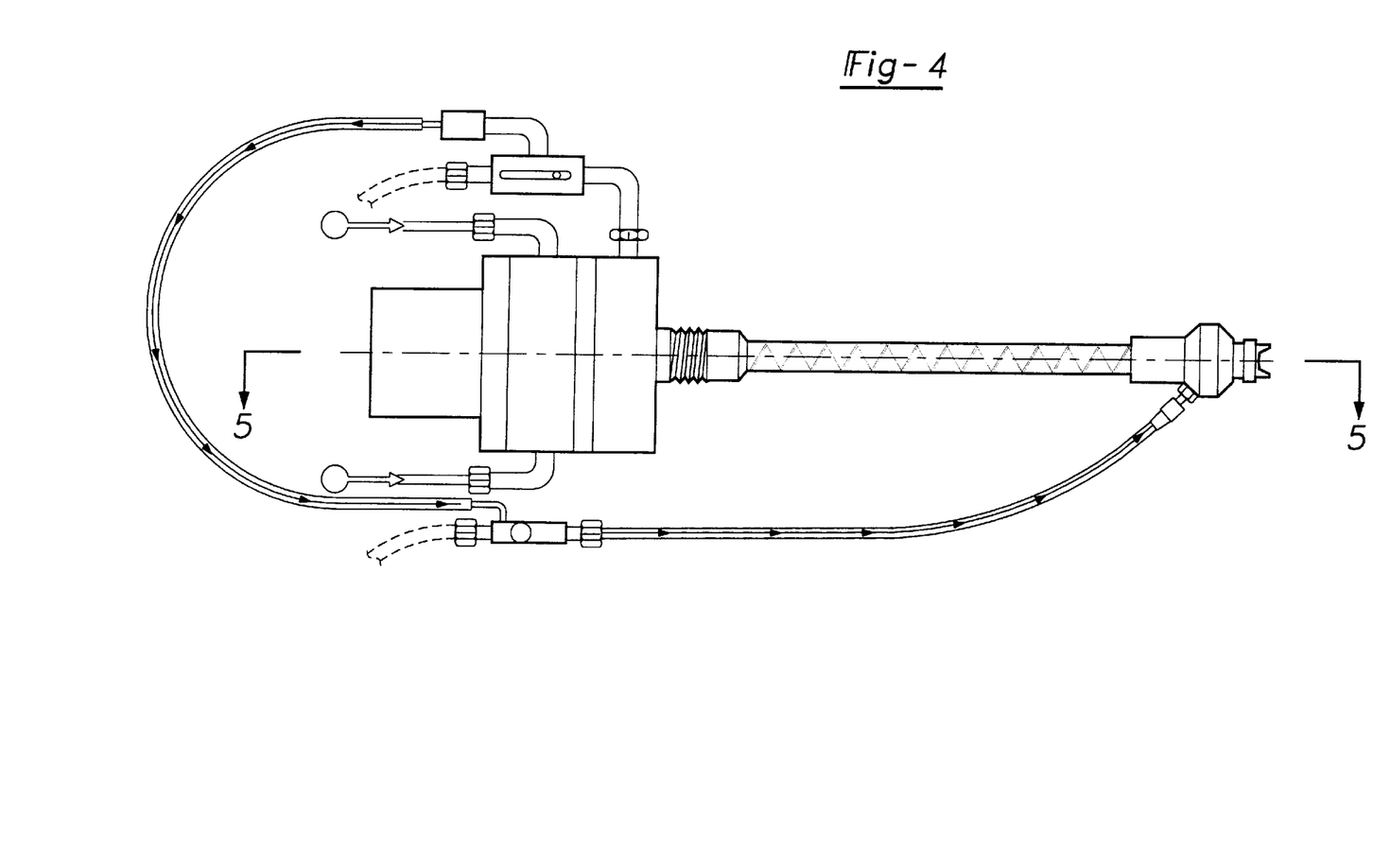
FIG. 4 is a top view of the spray gun assembly of the subject invention.

Referring again to FIG. 1 and also to FIG. 4, the spray gun assembly 14 includes a manifold 82 for receiving the first material 24 through the first fluid port 42 and the second material 28 through the second fluid port 46. A mixing device 84 is mounted to the manifold 82 for mixing the first 24 and second 28 materials together to form the two part polyurethane. A spray tip 86 is mounted to the distal end of the mixing device 84. An air cap 88 is mounted to a distal end of the spray tip 86 and is in fluid communication with the manifold 82 for spraying the two part polyurethane onto the surface 32. The air cap 88 includes atomizing outlet ports 90 for atomizing the two part polyurethane exiting the spray gun assembly 14.

A first air inlet port 92 is mounted in close proximity to the second fluid port 46 within the manifold 82 for delivering a gaseous material into the manifold 82, through the mixing device 84, and out the air cap 88. A first supply air hose 94 is included for supplying the gaseous material to the first air inlet port 92. A second air inlet port 96 is mounted on the spray tip 86 for delivering the gaseous material into the air cap 88. A spray tip air hose 98 supplies the gaseous material to the second air inlet port 96 and the air cap 88. A hose fitting 100 is included having two inlet ports 102, 104 and one outlet port 106. The spray tip air hose 98 is connected to the outlet port 106 of the hose fitting 100. A second supply air hose 108 is connected to one of the inlet ports 104 of the hose fitting 100 for supplying the gaseous material to the spray tip air hose 98. The first 94 and second 108 supply air hoses are connected to an air valve controller 110 having one inlet port 112 and two outlet ports 114, 116 wherein the gaseous material is only discharged through one of the outlet ports 114, 116 at any given time. More specifically, the first supply air hose 94 is connected to one of the outlet ports 114 of the air valve controller 110 and the second supply air hose 108 is connected to the other of the outlet ports 116 of the air valve controller 110. A compressor 118 is connected to the inlet port 112 of the air valve controller 110 for supplying the gaseous material to the first 94 and second 108 supply air hoses. The hose fitting 100 and air valve controller 110 are well known in the art and can be of any suitable design without deviating from the scope of the subject invention.

A crossover air hose 120 interconnects the first air inlet port 92 and the second air inlet port 96. More specifically, the crossover air hose 120 extends from a valve assembly 122 disposed on the first air inlet port 92 to one of the inlet ports 102 of the hose fitting 100. The crossover air hose 120 includes a check valve 124 to prevent the ingress of gaseous material from the hose fitting 100 into the valve assembly 122. These check valves are well known in the art and can be of any suitable design without deviating from the scope of the subject invention. The valve assembly 122 interconnects the first air inlet port 92, the first supply air hose 94, and the crossover air hose 120. The components of the spray gun assembly 14 are discussed in greater detail hereinbelow.

Figure 5:
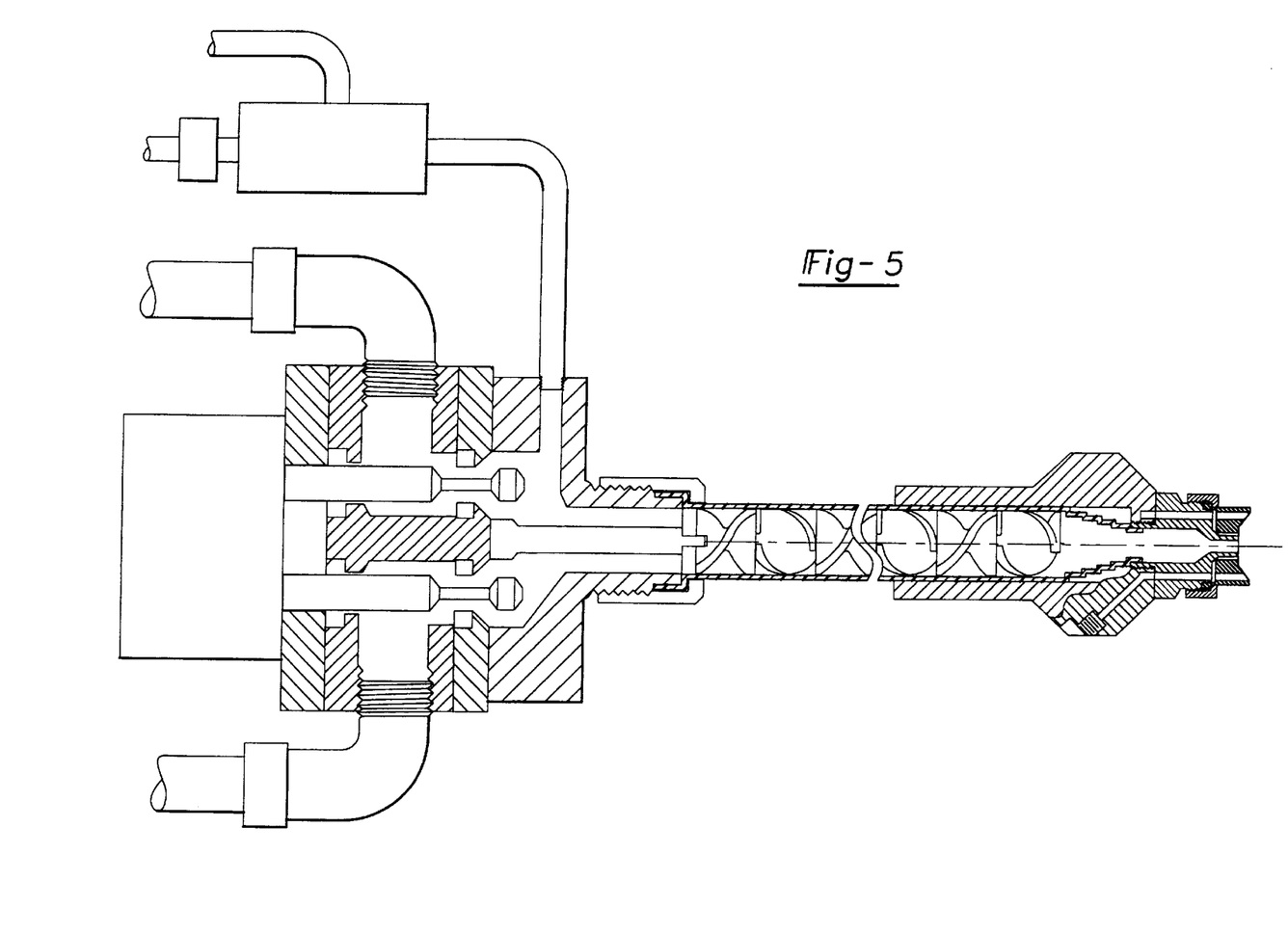
FIG. 5 is a cross-sectional view taken along line 5—5 of FIG. 4.
Figure 6:
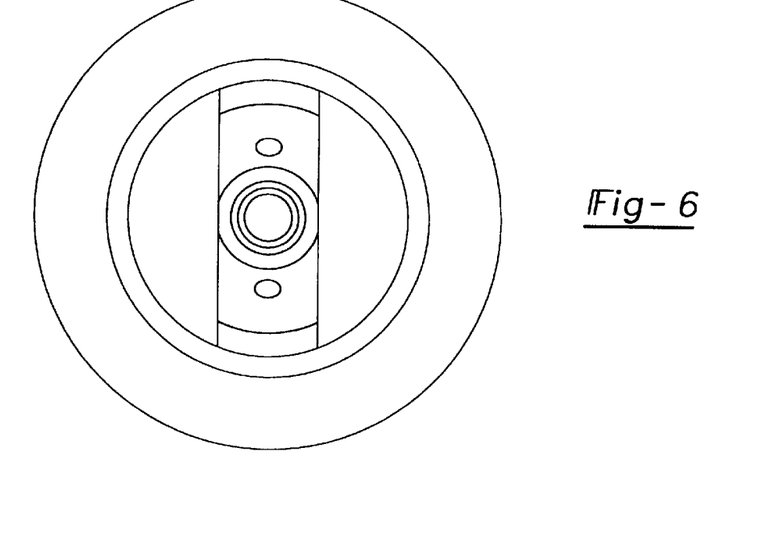
FIG. 6 is a frontal view taken along line 6—6 of FIG. 4.

Referring to FIGS. 4, 5, and 6, the spray gun assembly 14 includes first 126 and second 128 premixing chambers located within the manifold 82. An actuating valve 130 is disposed within each of the chambers 126, 128 for controlling the flow of the first 24 and second 28 materials through the first 126 and second 128 premixing chambers. The disclosed configuration of the valves 130 and chambers 126, 128 are purely illustrative of an effective design. Accordingly, the valves and chambers may be of any suitable design without deviating from the scope of the subject invention.

The first fluid port 42 is disposed within the first premixing chamber 126 for delivering the first material 24, which is the isocyanate, to the first premixing chamber 126. The second fluid port 46 is disposed within the second premixing chamber 128 for delivering the second material 28, which is the polyol resin, to the second premixing chamber 128. As discussed above, the mixing device 84, and air cap 88 are in fluid communication with the first 126 and second 128 premixing chambers of the manifold 82. A main outlet port 132 is disposed within the air cap 88. As best shown in FIGS. 5 and 6, the atomizing outlet ports 90 are also disposed within the air cap 88 and surround the main outlet port 132. More specifically, one of the atomizing outlet ports 90 completely surrounds the outlet port 132. A pair of atomizing outlet ports 90 are spaced equidistantly away from the outlet port 132 and are angled inwardly toward the outlet port 132.

The first air inlet port 92 is mounted in close proximity to the second fluid port 46 within the second premixing chamber 128 for delivering a gaseous material to the second premixing chamber 128, into the mixing device 84, through the air cap 88, and out the main outlet port 132. The first air inlet port 92 includes a check valve 134 to prevent the ingress of the second material 28 from the second premixing chamber 128 into the first air inlet port 92. As discussed above, the check valves may be of any suitable configuration. The second air inlet port 96 is mounted on the spray tip 86 for delivering the gaseous material into the air cap 88 and out the atomizing outlet ports 90.

Isocyanate terminated compounds are highly reactive to moisture. Accordingly, if the isocyanate came into direct contact with the gaseous material the moisture in the gaseous material would cause a severe reaction with the isocyanate. This reaction could damage the interior of the spray gun assembly 14 and clog any number of components. Hence, the gaseous material dispersed through the first air inlet port 92 cannot be discharged into the first premixing chamber 126 which releases the isocyanate.

The mixing device 84 is a static mixing tube 84 having first 136 and second 138 ends with the first end 136 threadingly engaging the manifold 82 and in fluid communication with the first 126 and second 128 premixing chambers. The second end 138 tapers inwardly in a stepped fashion, wherein the tip of the second end 138 seats within the air cap 88. Static mixing tubes of this type are well known in the art and are commercially available from TAH Industries, Inc. of Robbinsville, N.J. The static mixing tube 84 mixes the first 24 and second 28 materials before the first 24 and second 28 materials are discharged out the main outlet port 132.

As best shown in FIG. 5, the spray tip 86 includes a smooth inner bore 140 terminating at an inwardly projecting annular flange 142. The air cap 88 threadingly engages the annular flange 142 of the spray tip 86. An air channel 144 is machined within the spray tip 86 to interconnect the second air inlet port 96 with the atomizing outlet ports 90. The main outlet port 132 passes through the air cap 88. The second end 138 of the static mixing tube 84 seats within the air cap 88 to prevent any leakage of the first 24 and second 28 materials into the inner bore 140 of the spray tip 86.

The hose fitting 100, as best shown in FIG. 4, includes a needle valve 146 mounted between the inlet ports 102, 104 and the outlet port 106 for controlling the pressure of the gaseous material to the spray tip air hose 98. The needle valve 146 can be of any adequate design so long as the pressure within the hose fitting 100 can be sufficiently regulated.

During regular operation of the material circulating system 12 and the spray gun assembly 14, the actuation valves 130 within the first 126 and second 128 premixing chambers are opened to allow a flow of the first 24 and second 28 materials into the first 126 and second 128 premixing chambers. The first 24 and second 28 materials subsequently move into the static mixing tube 84 and are sufficiently mixed together to form the two part polyurethane. The two part polyurethane is then discharged out through the main outlet port 132 in the air cap 88. Simultaneously, the compressor 118 is activated and the air valve controller 110 opens the outlet port 116 to the second air supply hose 108. The gaseous material passes through the second air supply hose 108, through the hose fitting 100, through the spray tip air hose 98, through the air channel 144 in the spray tip 86, into the air cap 88 and discharges out through the atomizing outlet ports 90. The introduction of the gaseous material from the atomizing outlet ports 90 into the discharged liquid two part polyurethane atomizes the polyurethane. Hence, an even well dispersed stream of polyurethane is sprayed onto the desired surface 32. Of course this operation can be accomplished without atomization, wherein the two part polyurethane simply discharges out the main outlet port 132.

When not in operation, the spray gun assembly 14 must be completely cleaned of any mixed material. An air purging system in included on the spray gun assembly 14 for cleaning the spray gun assembly 14 after use. The air purging system generally includes the first air supply hose 94, the valve assembly 122, and the crossover air hose 120.

Accordingly, when the spray gun assembly 14 is not in use, the air valve controller 110 shuts off the supply of gaseous material to the second air supply hose 108 and opens the outlet port 114 to the first air supply hose 94. The gaseous material passes through the first air supply hose 94 and into the valve assembly 122. The valve assembly 122, which interconnects the first air inlet port 92, the first supply air hose 94, and the crossover air hose 120, simultaneously supplies the gaseous material to the first air inlet port 92 and the crossover air hose 120. This in turn simultaneously supplies the gaseous material to the second premixing chamber 128, the mixing device 84, the hose fitting 100, the spray tip air hose 98, the air channel 144 in the spray tip 86 and the air cap 88. Hence, the gaseous material is simultaneously discharged out the main outlet port 132 and the atomizing outlet ports 90 which removes the first 24 and second 28 materials from the mixing device 84, the air cap 88, the main outlet port 132, and the atomizing outlet ports 90. Accordingly, the atomizing outlet ports 90 are cleaned simultaneously with the main outlet port 132 to prevent any clogging of the atomizing outlet ports 90.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A system for mixing and initiating the reaction of two liquid reactive polymeric materials and spraying the mixture onto a surface, said system comprising;

a first pump having multiple pumping chambers with a diaphragm in each chamber, an inlet port on said first pump for delivering a first material to said diaphragms, a first drive assembly for sequentially moving said diaphragms to continuously move the first material through said first pump, an outlet port on said first pump for discharging the first material under pressure, a first flow meter connected to said outlet port of said first pump for receiving the first material under pressure, a first feedback controller interconnecting said first flow meter and said first drive assembly for governing said first drive assembly in response to fluid flow through said first flow meter, a second pump having multiple pumping chambers with a diaphragm in each chamber, an inlet port on said second pump for delivering a second material to said diaphragms, a second drive assembly for sequentially moving said diaphragms to continuously move the second material through said second pump, an outlet port on said second pump for discharging the second material under pressure, a second flow meter connected to said outlet port of said second pump for receiving the second material under pressure, a second feedback controller interconnecting said second flow meter and said second drive assembly for governing said second drive assembly in response to fluid flow through said second flow meter, a spray gun with first and second pre-mixing chambers, a first hose interconnecting said first flow meter and said first pre-mixing chamber for conveying the first material from said first flow meter to said first pre-mixing chamber, a second hose interconnecting said second flow meter and said second pre-mixing chamber for conveying the second material from said second flow meter to said second pre-mixing chamber, said spray gun having a mixing device for mixing the first and second materials from said pre-mixing chambers and a spray tip for spraying a mixture of the first and second materials onto a surface.

2. A system as set forth in claim 1 wherein said first drive assembly includes a first cam mechanism and said second drive assembly includes a second cam mechanism for sequentially moving said diaphragms.

3. A system as set forth in claim 2 including gearboxes for driving said first cam mechanism and said second cam mechanism.

4. A system as set forth in claim 3 including a first motor for driving said gearbox of said first cam mechanism and a second motor for driving said gearbox of said second cam mechanism.

5. A system as set forth in claim 1 wherein said first feedback controller includes a first digital readout display panel for programming a precise fluid flow through said first flow meter and said second feedback controller includes a second digital readout display panel for programming a precise fluid flow through said second flow meter.

6. A system as set forth in claim 5 wherein said second feedback controller is connected to said first feedback controller for coordinating the precise fluid flow through said first and second flow meters.

7. A system as set forth in claim 6 wherein said first and second feedback controllers automatically stop any fluid flow through the first and second flow meters when said first or second feedback controller senses a fault in said system.

8. A system as set forth in claim 7 wherein said second digital readout display panel is programmed to operate the fluid flow through said second flow meter at a specific percentage of the fluid flow through said first flow meter.

9. A system as set forth in claim 1 wherein said mixing device is a static mixing tube in fluid communication with said first and second pre-mixing chambers for mixing the first and second materials before the first and second materials are discharged onto the surface.

10. A system as set forth in claim 1 including a first by-pass loop for maintaining fluid flow of the first material through said first pump and a second by-pass loop for maintaining fluid flow of the second material through said second pump when said spray gun is disengaged.

11. A system as set forth in claim 10 wherein said first by-pass loop includes a first by-pass valve for eliminating any additional fluid flow of the first material into said first pump and said second by-pass loop includes a second by-pass valve for eliminating any additional fluid flow of the second material into said second pump when said spray gun is disengaged.

12. A system as set forth in claim 11 wherein said first by-pass loop includes a first regulator for maintaining a desired pressure within said first by-pass loop and said second by-pass loop includes a second regulator for maintaining a desired pressure within said second by-pass loop.

13. A system as set forth in claim 1 including a first pressure gauge port disposed within said pumping chambers of said first pump and a second pressure gauge port disposed within said pumping chambers of said second pump.

14. A system as set forth in claim 13 wherein said first pressure gauge port includes a first pressure gauge for displaying the amount of pressure within the first pump and said second pressure gauge port includes a second pressure gauge for displaying the amount of pressure within the second pump.

15. A spray gun assembly for mixing and initiating the reaction of two liquid reactive polymeric materials and spraying the mixture onto a surface, said assembly comprising;

a manifold having first and second pre-mixing chambers with an actuating valve disposed within each of said chambers;

a first fluid port disposed within said first pre-mixing chamber for delivering a first material to said first pre-mixing chamber;

a second fluid port disposed within said second pre-mixing chamber for delivering a second material to said second pre-mixing chamber;

a mixing device mounted to said manifold;

a spray tip mounted to said mixing device;

an air cap mounted to a distal end of said spray tip and in fluid communication with said first and second pre-mixing chambers of said manifold;

a main outlet port disposed within said air cap;

atomizing outlet ports disposed within said air cap surrounding said main outlet port;

a first air inlet port mounted in close proximity to said second fluid port within said second pre-mixing chamber for delivering a gaseous material to said second pre-mixing chamber, into said mixing device, through said air cap, and out said main outlet port;

a second air inlet port mounted on said spray tip for delivering the gaseous material into said air cap and out said atomizing outlet ports;

a cross-over air hose interconnecting said first air inlet port and said second air inlet port; and a first supply air hose for supplying the gaseous material;

said assembly characterized by;

a valve assembly interconnecting said first air inlet port, said first supply air hose, and said cross-over air hose for simultaneously supplying the gaseous material to said second pre-mixing chamber, said mixing device, said air cap, and said second air inlet port to simultaneously discharge the gaseous material out said main outlet port and said atomizing outlet ports for removing the first and second materials from said mixing device, said air cap, said main outlet port, and said atomizing outlet ports after spraying a mixture of the first and second materials onto a surface.

16. An assembly as set forth in claim 15 wherein said mixing device is a static mixing tube having first and second ends with said first end mounted to said manifold and in fluid communication with said first and second pre-mixing chambers and said second end mounted to said spray tip, said static mixing tube mixes the first and second materials before the first and second materials are discharged out said main outlet port.

17. An assembly as set forth in claim 16 wherein said spray tip includes a smooth inner bore terminating at an inwardly projecting annular flange.

18. An assembly as set forth in claim 17 wherein said air cap engages said inwardly projecting annular flange.

19. An assembly as set forth in claim 18 wherein said second end of said static mixing tube seats within said air cap to prevent any leakage of the first and second materials into said inner bore of said spray tip.

20. An assembly as set forth in claim 15 wherein said first air inlet port includes a check valve to prevent the ingress of the second material from said second pre-mixing chamber into said first air inlet port.

21. An assembly as set forth in claim 15 including a spray tip air hose for supplying the gaseous material to said second air inlet port and said air cap.

22. An assembly as set forth in claim 21 including a hose fitting having two inlet ports and one outlet port.

23. An assembly as set forth in claim 22 wherein said spray tip air hose is connected to said outlet port of said hose fitting.

24. An assembly as set forth in claim 23 wherein said cross-over air hose is connected to one of said inlet ports of said hose fitting.

25. An assembly as set forth in claim 24 including a second supply air hose connected to one of said inlet ports of said hose fitting for supplying the gaseous material to said spray tip air hose.

26. An assembly as set forth in claim 25 wherein said hose fitting includes a needle valve mounted between said inlet ports and said outlet port for controlling the pressure of the gaseous material to said spray tip air hose.

27. An assembly as set forth in claim 26 wherein said cross-over air hose includes a check valve to prevent the ingress of gaseous material from said hose fitting into said valve assembly.

28. An assembly as set forth in claim 27 including an air valve controller having one inlet port and two outlet ports wherein the gaseous material is only discharged through one of said outlet ports at any given time.

29. An assembly as set forth in claim 28 wherein said first supply air hose is connected to one of said outlet ports of said air valve controller and said second supply air hose is connected to the other of said outlet ports of said air valve controller.

30. An assembly as set forth in claim 29 including a compressor connected to said inlet port of said air valve controller for supplying the gaseous material to said first and second supply air hoses.

31. An assembly for mixing and initiating the reaction of two liquid reactive polymeric materials and spraying the mixture onto a surface, said assembly comprising;

a first pump having multiple pumping chambers with a diaphragm in each chamber;

an inlet port on said first pump for delivering a first material to said diaphragms;

a first drive assembly for sequentially moving said diaphragms to continuously move the first material through said first pump;

an outlet port on said first pump for discharging the first material under pressure;

a first flow meter connected to said outlet port of said first pump for receiving the first material under pressure;

a first feedback controller interconnecting said first flow meter and said first drive assembly for governing said first drive assembly in response to fluid flow through said first flow meter;

a second pump having multiple pumping chambers with a diaphragm in each chamber;

an inlet port on said second pump for delivering a second material to said diaphragms;

a second drive assembly for sequentially moving said diaphragms to continuously move the second material through said second pump;

an outlet port on said second pump for discharging the second material under pressure;

a second flow meter connected to said outlet port of said second pump for receiving the second material under pressure;

a second feedback controller interconnecting said second flow meter and said second drive assembly for governing said second drive assembly in response to fluid flow through said second flow meter;

a spray gun having a manifold with first and second pre-mixing chambers;

a first fluid port disposed within said first pre-mixing chamber for delivering the first material to said first pre-mixing chamber;

a second fluid port disposed within said second pre-mixing chamber for delivering the second material to said second pre-mixing chamber;

a first hose interconnecting said first flow meter and said first fluid port of said first pre-mixing chamber for conveying the first material from said first flow meter to said first pre-mixing chamber;

a second hose interconnecting said second flow meter and said second fluid port of said second pre-mixing chamber for conveying the second material from said second flow meter to said second pre-mixing chamber;

a mixing device mounted to said manifold;

a spray tip mounted to said mixing device;

an air cap mounted to a distal end of said spray tip and in fluid communication with said first and second pre-mixing chambers of said manifold for spraying a mixture of the first and second materials onto a surface;

a main outlet port disposed within said air cap;

atomizing outlet ports disposed within said air cap surrounding said main outlet port for atomizing the mixture of the first and second materials;

a first air inlet port mounted in close proximity to said second fluid port within said second pre-mixing chamber for delivering a gaseous material to said second pre-mixing chamber, into said mixing device, through said air cap, and out said main outlet port;

a second air inlet port mounted on said spray tip for delivering the gaseous material into said air cap and out said atomizing outlet ports;

a cross-over air hose interconnecting said first air inlet port and said second air inlet port;

a first supply air hose for supplying the gaseous material; and a valve assembly interconnecting said first air inlet port, said first supply air hose, and said cross-over air hose for simultaneously supplying the gaseous material to said second pre-mixing chamber, said mixing device, said air cap, and said second air inlet port to simultaneously discharge the gaseous material out said main outlet port and said atomizing outlet ports for removing the first and second materials from said spray gun after spraying the mixture of the first and second materials onto the surface.

* * * * *